United States Patent
Herrmann et al.

(10) Patent No.: US 8,194,571 B2
(45) Date of Patent: *Jun. 5, 2012

(54) PROTOCOL FOR RELIABLE, SELF-ORGANIZING, LOW-POWER WIRELESS NETWORK FOR SECURITY AND BUILDING AUTOMATION SYSTEMS

(75) Inventors: Falk Herrmann, Mountain View, CA (US); Arati Manjeshwar, Sunnyvale, CA (US); Jason Hill, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 681 days.

This patent is subject to a terminal disclaimer.

(21) Appl. No.: 12/344,767

(22) Filed: Dec. 29, 2008

(65) Prior Publication Data

US 2009/0103456 A1 Apr. 23, 2009

Related U.S. Application Data

(62) Division of application No. 10/301,478, filed on Nov. 21, 2002, now Pat. No. 7,483,403.

(60) Provisional application No. 60/347,569, filed on Jan. 10, 2002.

(51) Int. Cl.
*H04L 12/28* (2006.01)

(52) U.S. Cl. ......... 370/254; 370/310; 370/342; 370/350

(58) Field of Classification Search .......... 370/254, 370/310, 311, 315, 330, 389, 342; 709/224, 709/223, 237

See application file for complete search history.

(56) References Cited

U.S. PATENT DOCUMENTS

| | | | |
|---|---|---|---|
| 4,584,643 A * | 4/1986 | Halpern et al. | 709/248 |
| 5,036,518 A | 7/1991 | Tseung | |
| 5,553,076 A | 9/1996 | Behtash et al. | |
| 5,673,031 A | 9/1997 | Meier | |
| 5,790,952 A | 8/1998 | Seaholtz et al. | |
| 5,854,994 A | 12/1998 | Canada et al. | |
| 5,940,771 A | 8/1999 | Gollnick et al. | |
| 5,952,421 A | 9/1999 | Bradley et al. | |
| 5,974,236 A | 10/1999 | Sherman | |
| 6,078,269 A | 6/2000 | Markwell et al. | |
| 6,192,230 B1 * | 2/2001 | van Bokhorst et al. | 455/343.3 |
| 6,208,247 B1 | 3/2001 | Agre et al. | |
| 6,255,800 B1 | 7/2001 | Bork | |
| 6,255,942 B1 | 7/2001 | Knudsen | |

(Continued)

FOREIGN PATENT DOCUMENTS

DE 101 14 313 5/2003

(Continued)

OTHER PUBLICATIONS

European Search Report for EP 03 71 0654, dated Oct. 12, 2009.
Heinzelman, Wendi R., et al., "Energy-Efficient Communication Protocol for Wireless Microsensor Networks," Proceedings of the 33rd Annual Hawaii International Conference on System Sciences, vol. 2, 2000, pp. 1-10.

(Continued)

*Primary Examiner* — Ricky Ngo
*Assistant Examiner* — Rasheed Gidado
(74) *Attorney, Agent, or Firm* — Kenyon & Kenyon LLP

(57) ABSTRACT

A method to wirelessly network a sensor/actuator node is described. The sensor/actuator node is installed in a sensor/actuator node network and arranged in a hierarchical manner with a plurality of node levels and a cluster head network. A unique node identifier is assigned to the sensor node and the sensor node network is initialized. The sensor node is wokenup to perform a task and then set to an active low power mode.

37 Claims, 9 Drawing Sheets

U.S. PATENT DOCUMENTS

| | | | |
|---|---|---|---|
| 6,304,556 B1 * | 10/2001 | Haas | 370/254 |
| 6,374,311 B1 | 4/2002 | Mahany et al. | |
| 6,624,750 B1 * | 9/2003 | Marman et al. | 340/506 |
| 6,868,079 B1 * | 3/2005 | Hunt | 370/345 |
| 6,980,537 B1 * | 12/2005 | Liu | 370/338 |
| 7,035,240 B1 * | 4/2006 | Balakrishnan et al. | 370/338 |
| 7,126,926 B1 * | 10/2006 | Bjorklund et al. | 370/328 |
| 2002/0055989 A1 * | 5/2002 | Stringer-Calvert et al. | 709/220 |
| 2003/0012168 A1 * | 1/2003 | Elson et al. | 370/338 |
| 2004/0003111 A1 * | 1/2004 | Maeda et al. | 709/237 |

FOREIGN PATENT DOCUMENTS

| | | |
|---|---|---|
| EP | 0 833 288 | 4/1998 |
| EP | 0 874 341 | 8/2003 |
| EP | 1039689 | 9/2009 |

OTHER PUBLICATIONS

Sohrabi, Katayoun, et al., "Protocols for Self-Organization of a Wireless Sensor Network," IEEE Personal Communications, vol. 7, No. 5, 2000, pp. 16-27.

Chen, Wenli, et al., "ANMP: Ad Hoc Network Management Protocol," IEEE Journal on Selected Areas in Communications, vol. 17, No. 8, 1999, pp. 1506-1531.

Pei, Guangyu, et al., "Low Power TDMA in Large Wireless Sensor Networks," Milcom 2001. Proceedings. Communications for Network-Centric Operations: Creating the Information Force. McLean, VA, [IEEE Military Communications Conference], vol. 1, Oct. 28, 2001, pp. 347-351.

* cited by examiner

PROTOCOL FOR RELIABLE, SELF-ORGANIZING, LOW-POWER WIRELESS NETWORK FOR SECURITY AND BUILDING AUTOMATION SYSTEMS

CROSS-REFERENCE TO RELATED APPLICATIONS

This application is a divisional of prior U.S. patent application Ser. No. 10/301,478, filed on Nov. 21, 2002, which claims priority to U.S. Provisional Patent Application Ser. No. 60/347,569, filed on Jan. 10, 2002, all of which are incorporated herein by reference, in their entirety.

FIELD OF THE INVENTION

The present invention describes a protocol to wirelessly network sensors and actuators for surveillance and control.

BACKGROUND INFORMATION

Networks may be applied for surveillance and control. However, a substantial amount of the cost to implement such networks may include, for example, planning the network, installing the network elements, and configuring/reconfiguring the arrangement of network elements. Furthermore, such networks may include battery-powered devices that may impose restrictions regarding resource consumption and/or network topology constraints.

SUMMARY OF THE INVENTION

The present invention describes a protocol to wirelessly network sensors and actuators for surveillance and control, including, for example, smoke detectors, motion detectors, temperature sensors, door contacts, alarm sounders, or valve actuators. The protocol may build upon a hierarchical system architecture including at least two different node types of varying complexity forming two independent networks (so called cluster head and sensor/actuator node networks), thereby avoiding a single point of failure. The entire system, which is discussed in the United States patent application entitled "Self-Organizing Hierarchical Wireless Network for Surveillance and Control" filed on Nov. 21, 2002, may be controlled in a distributed manner by a small number of backbone nodes (so called cluster heads), and the information about the entire network may be accessed at each cluster head. For smaller systems, a single backbone node may be used (e.g., a single cluster head).

The present invention may also describe a protocol for forming, maintaining, and using the sensor/actuator node network. These sensor/actuator nodes may form an ad-hoc multi-hop network with each other and with the cluster heads. Since a majority of the sensor/actuator nodes may be battery-operated, energy efficient may be a consideration. Hence, the message overhead may be kept at a required minimum. In this regard, the protocol may simultaneously achieve low power consumption, while maintaining reliability and scalability, and rapid forwarding of occasional urgent messages. The protocol may also allow the network to continuously improve itself and update information about the quality of all available RF links in order to adapt to changing propagation conditions and/or link/node failure. Upon installation, the sensor/actuator node network may arrange itself based on global information about link quality and connectivity shared and processed at the cluster heads. User interaction during the setup, or detailed planning may not be required. In case of link or node failures, the protocol may allow for automatic reconfiguration to ensure connectivity between the majority of the devices throughout the operational lifetime of the system.

DETAILED DESCRIPTION

In the following description, the term "sensor node" may be used to collectively refer to both sensor nodes and actuator nodes. Likewise, the term "sensor node network" may be use to collectively refer to networks consisting of sensors and/or actuators. Communications within the sensor node network may be based on carrier sense multiple access (CSMA) with randomized back-off. Transmitted packets may include a preamble as defined by the physical layer, as well as a start symbol and control bytes, a packet type, a packet length, source and/or destination node identifiers, and a cyclic redundancy check (CRC). Optionally, transmission may be secured via link layer encryption with the exchange of a shared key, and authenticated with a message authentication code (MAC).

Figure 1A:
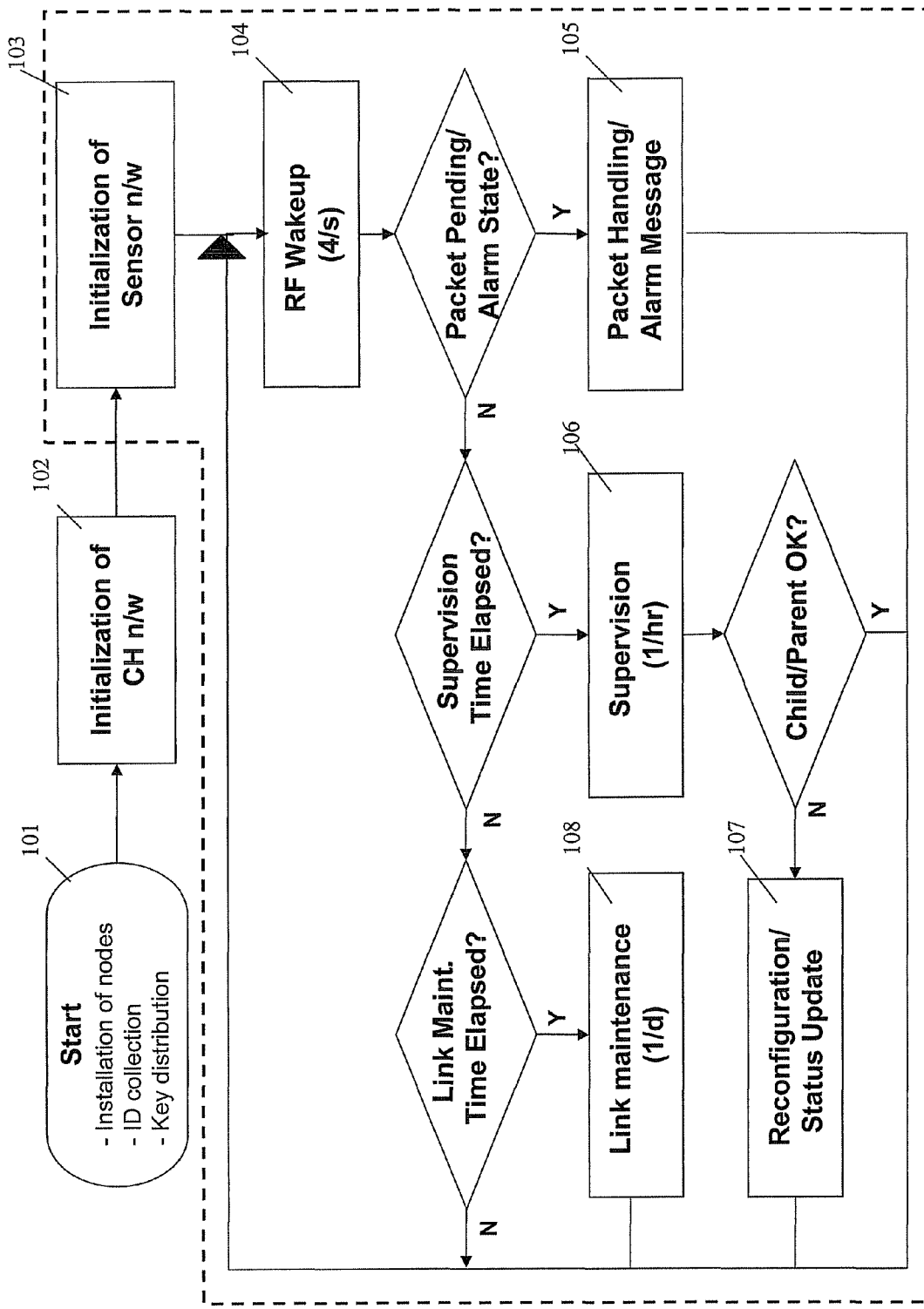
FIG. 1A is a flow chart representing an exemplary protocol method to wirelessly network sensors and/or actuators.

FIG. 1A is a flow chart representing an exemplary protocol method to wirelessly network sensors and/or actuators. In step 101, the network nodes are installed, unique identifiers (IDs) of the nodes are collected, and encryption keys are distributed. A maximum communication distance between two sensor nodes or between a sensor node and the closest cluster head may limit the physical arrangement of sensor nodes. Once arranged, the nodes may be activated and/or their unique node identifier and geographic location may recorded via a wire-based or wireless interface and/or a manual input arrangement. For example, such activation or recording may occur via an installation tool with a bar code scanner. Alternatively, each node may be programmed with a short intra-network ID, which may also serve as a reference for the user to the physical location of the device. This may be achieved, for example, by manual input (e.g., dip switch array), or by electronically storing the ID in the sensor node. A panel PC may further, for example, transfer the sensor node data from the installation tool to one of the cluster heads. Upon activation the nodes remain in "active low power mode" as described more fully below.

In step 102, the cluster head network is initialized. Initialization, as well as installation, of the cluster head network is described in the United States patent application entitled "Self-Organizing Hierarchical Wireless Network for Surveillance and Control" filed on Nov. 21, 2002. Alternatively, a single base station may be used in place of a cluster head network. However, in this document, the term "cluster head network" is used collectively to refer to either the single base station or the cluster head network.

In step 103, the sensor node network is initialized by establishing a temporary topology, synchronizing the nodes, and registering them with the appropriate cluster head. Following initialization, the sensor nodes may "retire" to the active low power mode to conserve resources, such as, for example, to conserve battery power.

In step 104, the sensor nodes may be "woken-up", such as, for example, one to four times per second, to receive a RF wakeup message. Depending on the incoming transmissions or the time elapsed, the sensor node may perform one or more procedures. For example, if a packet is pending or an alarm state is generated, then in step 105 a packet handling or alarm message procedure may be performed to handle the incoming data or the generated alarm. Alternatively, for example, if a supervision period has elapsed (e.g., once per hour), then in step 106 a supervision procedure may be performed to check, for example, the status of its children and/or parent node so that in step 107 a reconfiguration/status update procedure may be performed. Furthermore, for example, if a link maintenance period has elapsed (e.g., once per day), then in step 108 a link maintenance procedure may be performed. Once the procedures have been completed, the sensor node may return to the active low power mode and await another RF wakeup message. Each of the procedures, as well as the interactions between network elements is more fully described below.

The initialization of the sensor node network may include three phases, such as, for example, a Temporary Topology Establishment & Synchronization phase, a Link Discovery & Assessment phase, and a Sensor Node Registration phase. In the Temporary Topology Establishment & Synchronization phase and an initial pre-operation topology for the sensor node network is determined and the clocks of the sensor nodes are synchronized. In the Link Discovery and Assessment phase the connectivity between network elements is examined and reviewed. In the Sensor Node Registration phase the network elements forward information that was gathered during the Link Discovery and Assessment phase to the cluster head network.

Figure 1B:
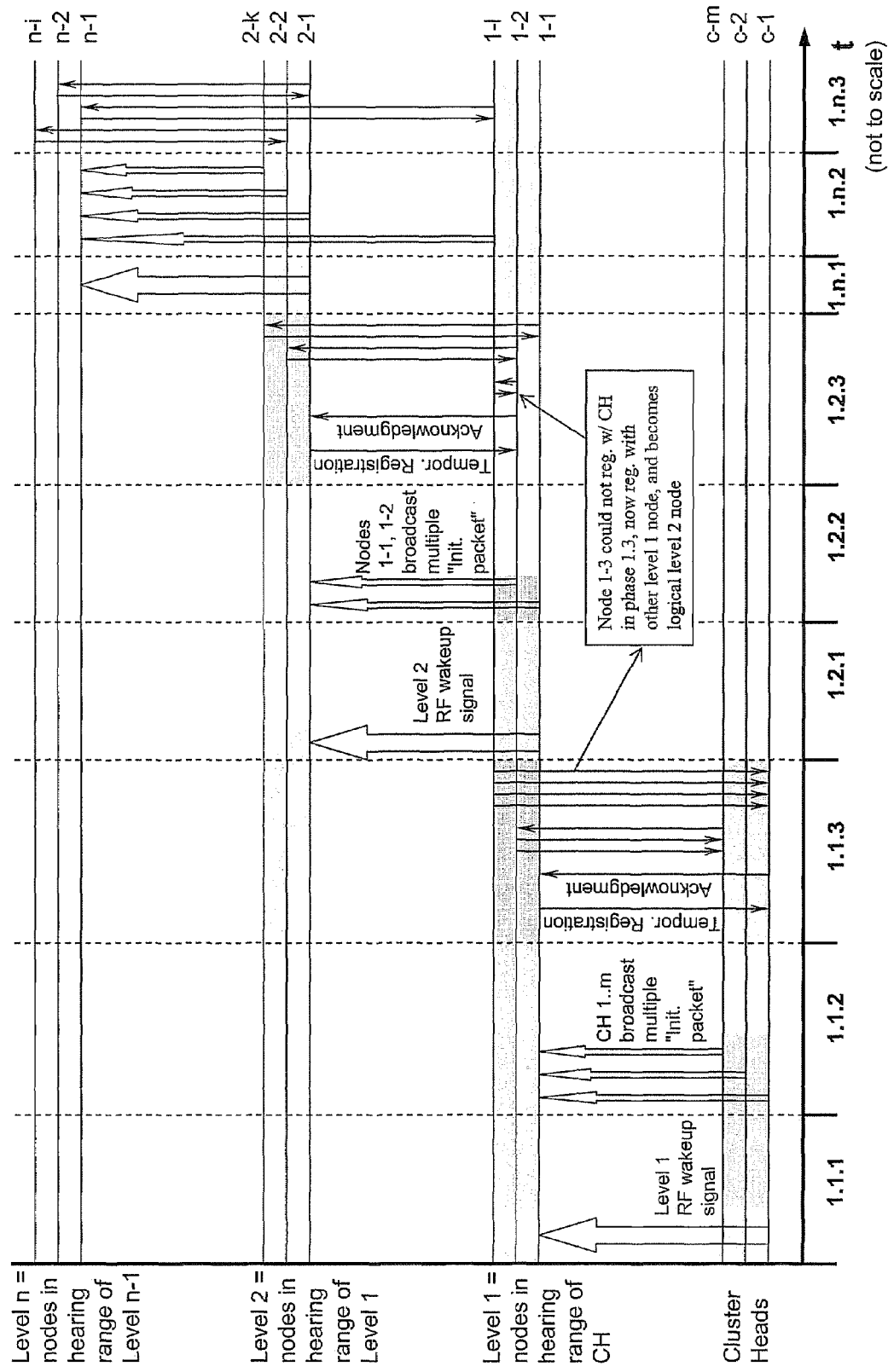
FIG. 1B shows an exemplary message exchange diagram for a temporary topology and establishment phase.

FIG. 1B shows an exemplary message exchange diagram for the Temporary Topology and Establishment phase. A horizontal axis t of the diagram representing time is segmented into times slots 1.1.1 through 1.$n$.3. A vertical axis of the diagram representing the hierarchical order of network elements is segmented into cluster heads at the bottom and sensor nodes shown in an increasing level 1 through level n towards the top. Each horizontal line above the time axis t, represents a particular instance of a network element—either a particular instance of a cluster head or a particular instance of level 1 node or a particular instance of level 2 node or a particular instance of a level n node. More precisely, lines c-1, c-2, and c-m represent the first, second, and upper limit individual instances of the cluster heads; lines 1-1, 1-2, and 1-1 represent the first, second, and upper limit individual instances of the level 1 nodes; lines 2-1, 2-2, and 2-$k$ represent the first, second, and upper limit individual instances of level 2 nodes; and lines n-1, n-2, and n-i represent the first, second, and upper limit individual instances of the highest level nodes. The shading surrounding a horizontal line indicates the predominate activity or mode of the associated network element—a dark shading indicating a "transmit/receive" mode, a light shading indicating the "active low power" mode, and a clear or non-opaque shading indicating an "receive-only" mode.

Arrows represent RF message transmissions between the network elements. In particular, a "broad" non-opaque arrow represents a broadcast message to all nodes within a particular level and a "thin" solid line represents a unicast message sent to only one instance of a network element.

In time slot 1.1.1, the cluster heads simultaneously broadcast an "RF wakeup signal". The receiving nodes within the transmission range of the broadcast (i.e., "the first level nodes") change from the active low power mode to the receive-only mode. Next, in time slot 1.1.2, the cluster heads c-1 through c-m individually broadcast a predefined number of "initialization packets". An initialization packet may include, for example, an identifier of the transmitting cluster head, a counter, and a time stamp. Next, in time slot 1.1.3, the receiving first level nodes synchronize their clocks, send a "temporary registration packet" to the cluster head with the best link quality as determined, for example, based on the packet success rate and/or the strongest RF power level, and then wait for acknowledgement (ack). Once acknowledged, the first level nodes may remain in the receive-only mode or may return to the active low power mode until time slot 1.2.1.

If no acknowledgement is received, the first level node may attempt one or more retransmissions of the temporary registration packet. If after a predefined number of retransmission attempts an acknowledgement is still not received, the first level node may attempt contact the cluster head determined to have the next best link quality. If after repeated attempts to retransmit to a predefined maximum number of successive cluster heads still results in failure to receive an acknowledgement, the first level node may return to the active low power mode.

In time slot 1.2.1, the first level nodes 1-1 and 1-2, that received an acknowledgement from a broadcasting cluster head, then broadcast a "RF wakeup signal". The receiving nodes within the transmission range of the broadcast (i.e., "the second level nodes") change from the active low power mode to the receive-only mode. In time slot 1.2.2, the first level nodes 1-1 and 1-2 then individually broadcast a predefined number of "initialization packets". The initialization packets may include, for example, an identifier of the transmitting node, a counter, and a time stamp. In time slot 1.2.3, the receiving second level nodes synchronize their clocks, send a "temporary registration packet" to the first level node with the best link quality as determined, for example, based on the packet success rate or the strongest RF power level, and then wait for acknowledgement. Once acknowledged, the second level nodes may remain in the receive-only mode or may return to the active low power mode until time slot 1.2.1.

If no acknowledgement is received, the second level node may attempt one or more retransmissions of the temporary registration packet. If after a predefined number of retransmission attempts an acknowledgement is still not received, the second level node may attempt to contact the first level node determined to have the next best link quality. If after repeated attempts to retransmit to a predefined maximum number of successive first level nodes still results in failure to receive an acknowledgement, the first level node may return to the active low power mode.

In time slot 1.$n$.1, the process of nodes at a lower level waking up nodes at a next higher level, allowing them to synchronize and then temporarily register with the lower level nodes, may be repeated until all nodes are activated or until nodes of a predefined upper limit level have been activated. The predefined upper limit level may be user-defined, for example.

Figure 2:
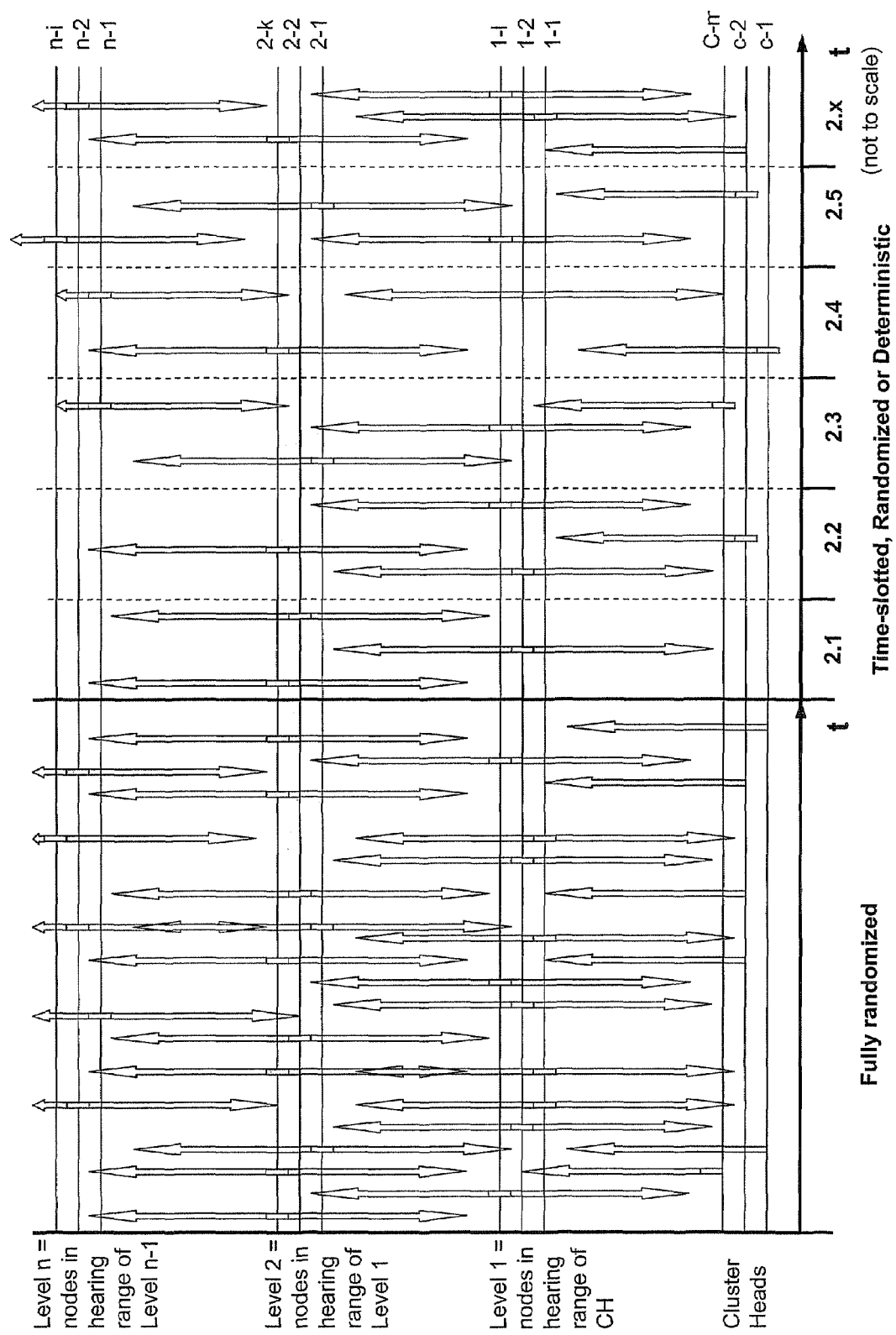
FIG. 2 shows an exemplary message exchange diagram for a link discovery and assessment phase.

FIG. 2 shows an exemplary message exchange diagram for the Link Discovery and Assessment phase. As in FIG. 1B, the horizontal axis t represents time and the vertical axis represents the hierarchical order of network elements. Likewise, the horizontal lines above the time axis t represent specific instances of the network elements, shading surrounding a horizontal line indicates the predominate activity or mode, and arrows represent RF message transmissions. However, unlike FIG. 1B, the time axis t of FIG. 2 represents an overall time slot 2 that includes an initial fully randomized segment followed by a time-slotted, randomized or deterministic segment representing two alternative approaches to link discovery and assessment.

To discover links and assess them, the nodes and/or the cluster heads may broadcast "link assessment packets" to all nodes within transmission range so that these receiving nodes may build link statistics based on, for example, the power level and/or packet success rate to the reachable network elements. The link assessment packet may include, for example, an identifier of the transmitting node and a counter.

The number of link assessment packets broadcast should be sufficiently large so that proper link statistics may be built [collected and constructed]. Packet scheduling of the large number of generated packets may be handled according to at least two approaches, including, for example, the fully randomized approach and the time-slotted randomized or deterministic approach. In the fully randomized approach, the nodes, over a given period t, randomly broadcast a predefined number of link assessment packets and attempt to receive as many packets as possible when not transmitting. Alternatively, in the time-slotted randomized or deterministic approach, the given period is divided into time slots 2.1 through 2.x, wherein in each time slot a series of link assessment packets is transmitted. In the time-slotted randomized or deterministic approach, each node transmits only within a small fraction of an available time slot (e.g., less than 10%) so that the probability of transmission is less than the probability of receiving. The decision whether or not to transmit within a particular time slot may be performed in three optional ways. In the first case, a random decision is made at the beginning of every time slot. In the second case, a pseudo-random algorithm may be used to determine in which time slots transmission should occur and in which time slots receiving should occur. The "seed" or basis for the algorithm may be unique for each node, such as, for example, the unique node identifier or a part of the unique node identifier. If the seed and algorithm are known by a cluster head, the cluster head may re-compute transmission slots for each node. Hence, the cluster head may determine those times slots during which interference between neighboring nodes is likely to occur so that they may be avoided during link assessment, thereby increasing the reliability of link assessment of the network. In the third case, the decision whether or not to transmit in a particular time slot may be based on a code, such as, for example, an Orthogonal Optical Code (OOC), which may ensure that any two nodes interfere at most in only one time slot.

Figure 3:
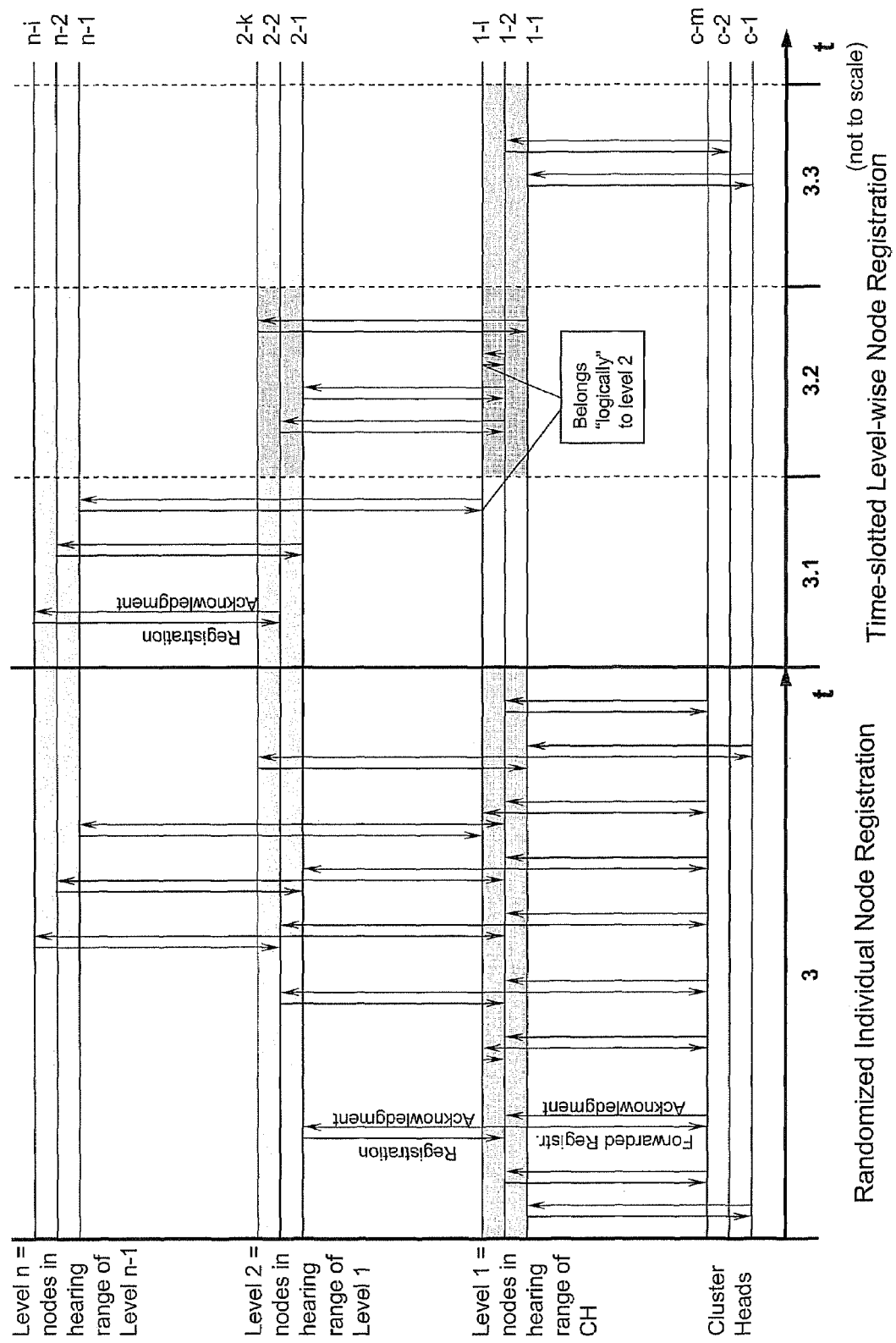
FIG. 3 shows an exemplary message exchange diagram for a sensor node registration phase.

FIG. 3 shows an exemplary message exchange diagram for the Sensor Node Registration phase. As in the previous figures, the horizontal axis t represents time and the vertical axis of the diagram represents the hierarchical order of network elements. Likewise, the horizontal lines above the time axis t represent specific instances of the network elements, shading surrounding a horizontal line indicates the predominate activity or mode, and arrows represent RF message transmissions.

However, unlike the previous figures, the time axis t in FIG. 3 represents an overall time slot 3 that includes a randomized individual node registration segment 3.0 followed by a time-slotted layer-wise node registration segment 3.1 to 3.3 representing two alternative approaches to sensor node registration.

During sensor node registration, link quality statistics may be forwarded from a sensor node to a cluster head via intermediate nodes using "registrations packets", which may include, for example, the link quality data from all neighboring nodes or a selected number of nodes deemed to have the best links, as well other data regarding their respective links. Bi-directional link quality information may be achieved at the cluster heads by combining the unidirectional link quality information from the two nodes of every node pair. Registration may be handled according to at least two approaches, including, for example, the randomized individual node approach and the time-slotted level-wise approach. In the randomized individual node approach, packet routing may be handled according to the exemplary temporary topology establishment method discussed earlier and an optional end-to-end acknowledgement may occur between the cluster head and the sensor nodes. Alternatively, in the time-slotted layer-wise approach, specific time slots may be used to register nodes at each level, starting, for example, with the highest level nodes. The registration data from the higher level nodes may then be appended (i.e., "piggy-backed") to registration packets transmitted by the lower levels. If required, the lower level nodes may retransmit the registration packet. To ensure a proper registration message exchange, sensor node registration may utilize active or passive acknowledgement. Upon verification of a successful exchange, the registered node may retire to the active power mode.

Based on the link quality statistics received during sensor node registration, the cluster heads may compute one or more topologies for the sensor node network depending on the particular function performed by the nodes. For example, a "supervision tree" topology may be computed for nodes performing a supervision function or an "alarm tree" topology may be computed for nodes performing an alarm/control message handling function. Such specifically defined topologies are more fully explained below.

The sensor nodes may be generally organized in a multi-tree structure with a cluster head at each root of the tree. To ensure an optimum topology, one or more factors may be considered. For example, it may be desirable to use "good" links (e.g., links not experiencing excessive packet retransmissions) to minimize message delay, to reduce power consumption, to avoid collisions, to limit the maximum number of levels, and to balance the load placed on the network so that the expected battery life of all nodes may be essentially equalized.

Figure 4A:
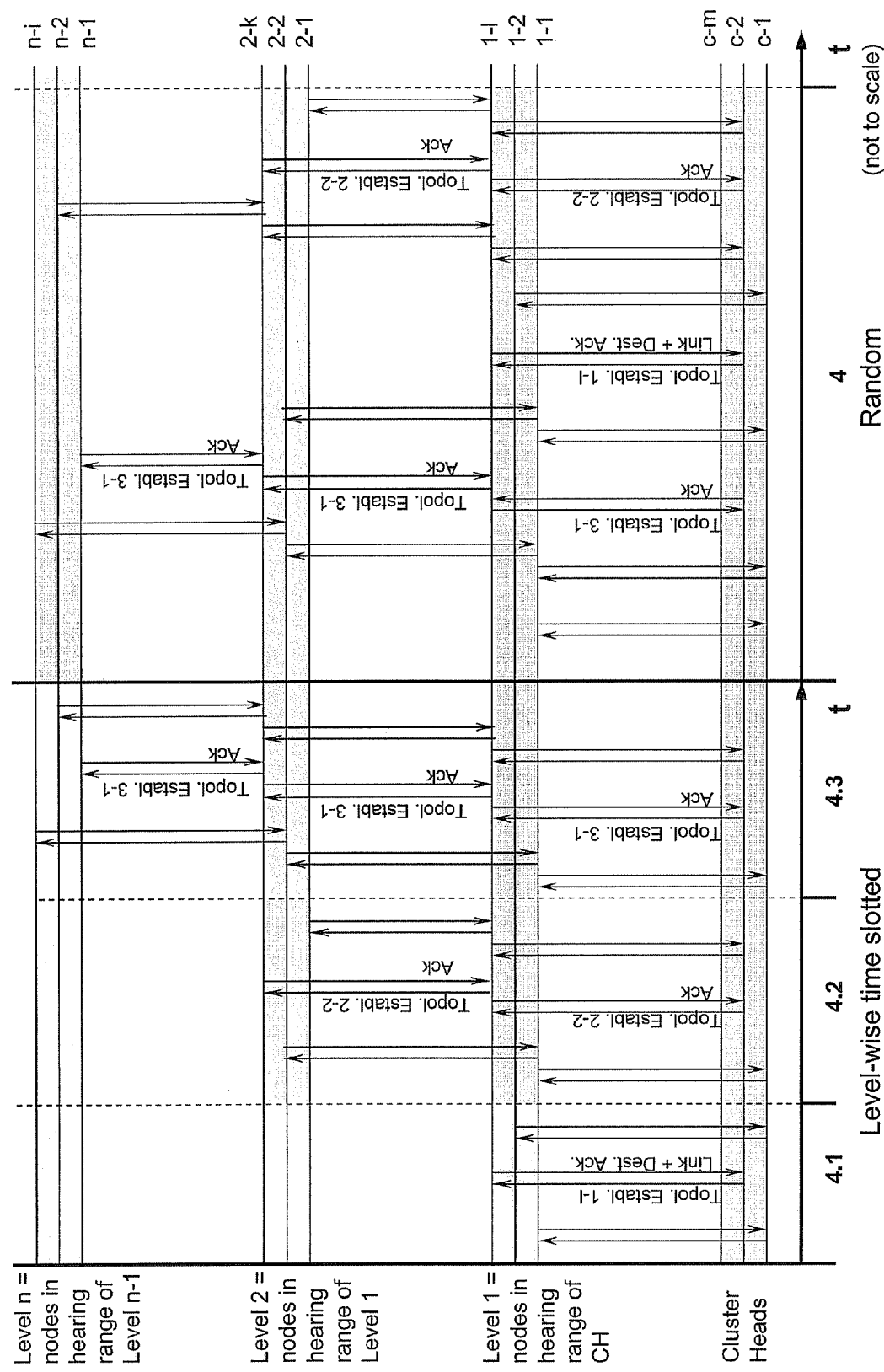
FIG. 4A shows an exemplary message exchange diagram for distributing the established topology of the sensor node network.

FIG. 4A shows an exemplary message exchange diagram for distributing the established topology of the sensor node network. As in previous figures, the horizontal axis t represents time and the vertical axis of the diagram represents the hierarchical order of network elements. Likewise, the horizontal lines above the time axis t represent specific instances of the network elements, shading surrounding a horizontal line indicates the predominate activity or mode, and arrows represent RF message transmissions. However, unlike previous figures, the time axis t in FIG. 4A represents an overall time slot 4 that includes a level-wise time-slotted distribution segment followed by a random distribution segment representing two alternative approaches to distribute the established sensor node network topology.

To distribute the established sensor network topology, the cluster heads may send "topology establishment packets" to each node. The topology establishment packets may include, for example, a definition of the node's children, its currently assigned parent or parents (nodes may optionally be assigned, for example, in two different network topologies), its potential parents, its node level, keys for pair-wise encryption, frequency channels, timing information for supervision, and a time stamp. The particular level of an individual node in the new network topology may not be identical to its respective level in the temporary topology. In particular, for example, the node, while physically within the reception range of a cluster head may nonetheless be assigned to the second level of nodes since such an arrangement may be desired for an overall optimized topology. In the level-wise time-slotted distribution approach, the topology establishment packets may be sent collectively to nodes at the same level within a time slot reserved for that level. For instance, in FIG. 4A all nodes at level 1 may be sent topology establishment packets in time slot 4.1; all nodes at level 2 may be topology establishment packets in time slot 4.2; and all nodes at level 3 may be sent topology establishment packets at time slot 4.3. Alternatively, in the random distribution approach, topology establishment packets may be sent to nodes at any level within the overall time slot 4.

To ensure proper establishment, active or passive link level acknowledgement may be used. In addition, an optional end-to-end acknowledgement from the nodes to the cluster heads may also be supported.

Once established in the network, nodes may retire to the active low power mode and await activation via a RF wakeup signal. Throughout the life-time of the established network, nearly all components of the nodes, except for those deemed critical, such as, for example, a real-time clock of a battery-operated node, may remain predominantly in a low power/sleep mode so that their battery operation may be extended (the average current draw, for example, may be within the uA range). Periodically and/or during scheduled times, the components may be activated (i.e., "woken up" from the low power/sleep mode) to perform a task, such as, for example, to perform a self-test or to monitor a RF channel. In particular, a micro-controller may be woken up to perform self-test routines (e.g., checking the battery status) or to take readings from associated sensors. Alternatively, the RF channel may be monitored during regular intervals, such as, for example, every 100 to 1000 milliseconds, so that a proper low-latency of message handling may be ensured. Should an irregularity be discovered, the detecting node may issue an alarm message.

Figure 4B:
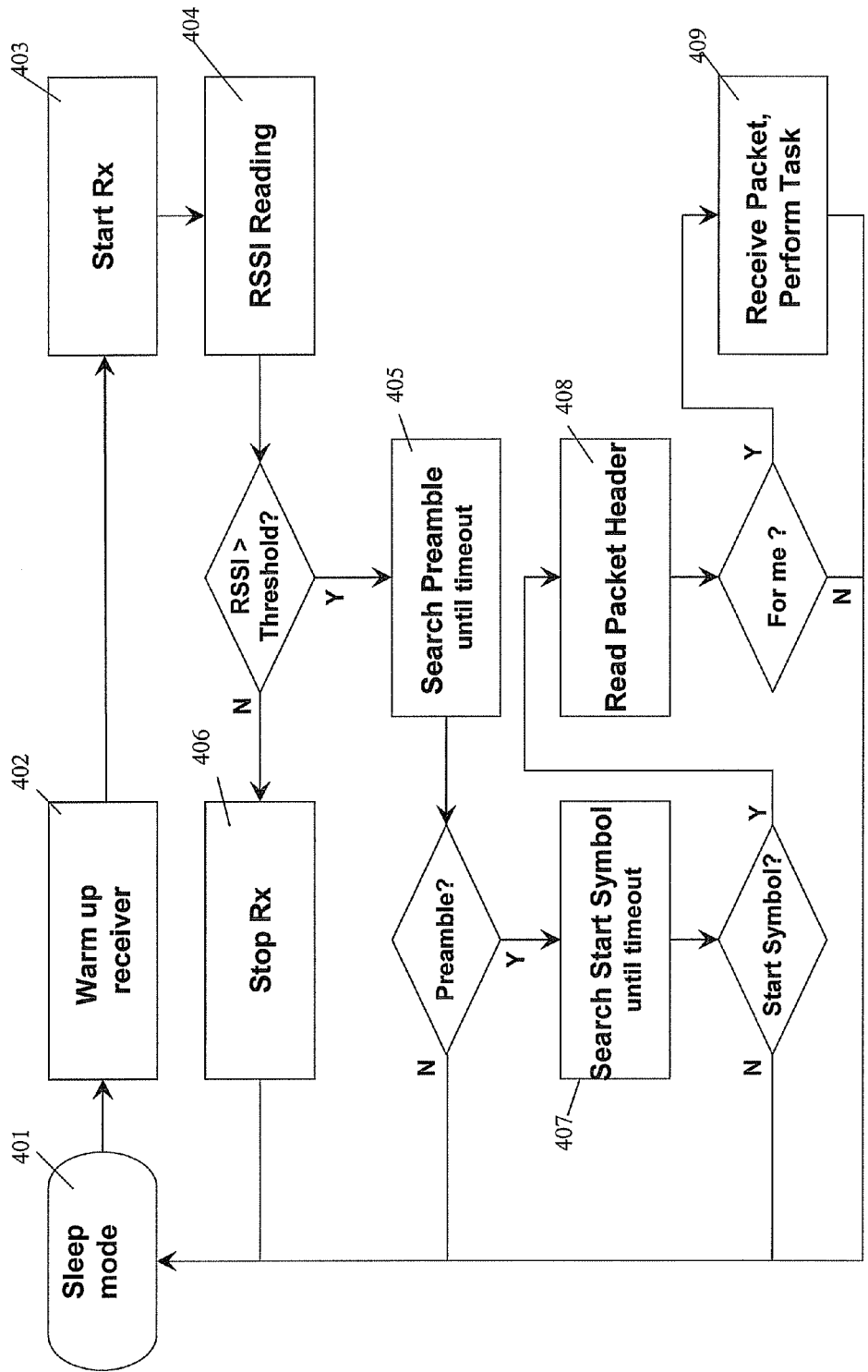
FIG. 4B shows an exemplary method for monitoring a RF channel.

FIG. 4B shows an exemplary method for monitoring a RF channel. In steps 401, the sensor node is set in the active low power mode. In step 402 to 404, a micro-controller of the sensor node wakes up and activates a receiver component which performs a receive-signal-strength indicator (RSSI) measurement in a reserved "RF wakeup channel". If the RSSI measurement is greater than a predefined threshold, then according to step 405 the preamble is searched for a characteristic RF wakeup sequence (e.g., an alternating sequence of logic states: 1-0-1-0-1 . . . ), otherwise, according to step 406 the node returns to the active low power mode. If the characteristic RF wakeup sequence is detected, then according to step 407 a search is performed for a valid start sequence by scanning one or more channels. Transmission of the characteristic RF wakeup sequence may be segregated among multiple RF channels according to the type of function/task to be performed, which may in turn be assigned relative priorities so that particular functions/tasks may be monitored at different frequencies according to their respective required maximum latencies. Thus, the search for a valid search sequence may be performed by scanning according to a predefined priority, such as, for example, by scanning a channel dedicated for alarm messages, then scanning a channel dedicated for control messages, and then scanning a channel dedicated for supervision messages.

If a valid start sequence is not found within a predefined timeout period, the node returns to the active low power node, otherwise if a valid start sequence is found then according to step 408 the packet header is read to determine its intended recipient. If the packet is intended for another node or is invalid, then the packet is discarded and the node returns to the active low power mode. Otherwise, if the packet is intended for this node, then according to step 409 the packet is received and the appropriate task performed.

To ensure proper control of message handling within the network, the messages may be distinguished according to one or more priority classifications, such as, for example, a high priority message and a low priority message. High priority messages may be used to send commands from the cluster head to the sensor node requiring immediate attention and/or reaction, such as, for example, the arming/disarming of nodes and the reprogramming node firmware. To send a high priority message, special "high priority control packets" may be sent in unicast to a single node or in multicast to a group of nodes. If sent in unicast, the high priority control packets may include a time stamp, a specified path from the cluster head to the target node, and a command to be executed at the target node. If sent in multicast, the high priority control packets may include a time stamp, a list of target nodes or target group identifier, a list of forwarding nodes, and a command to be executed at the target nodes. The high priority packets may be preceded by a RF wakeup sequence. Additionally, acknowledgements at the link level and/or end-to-end may be used.

Figure 5:
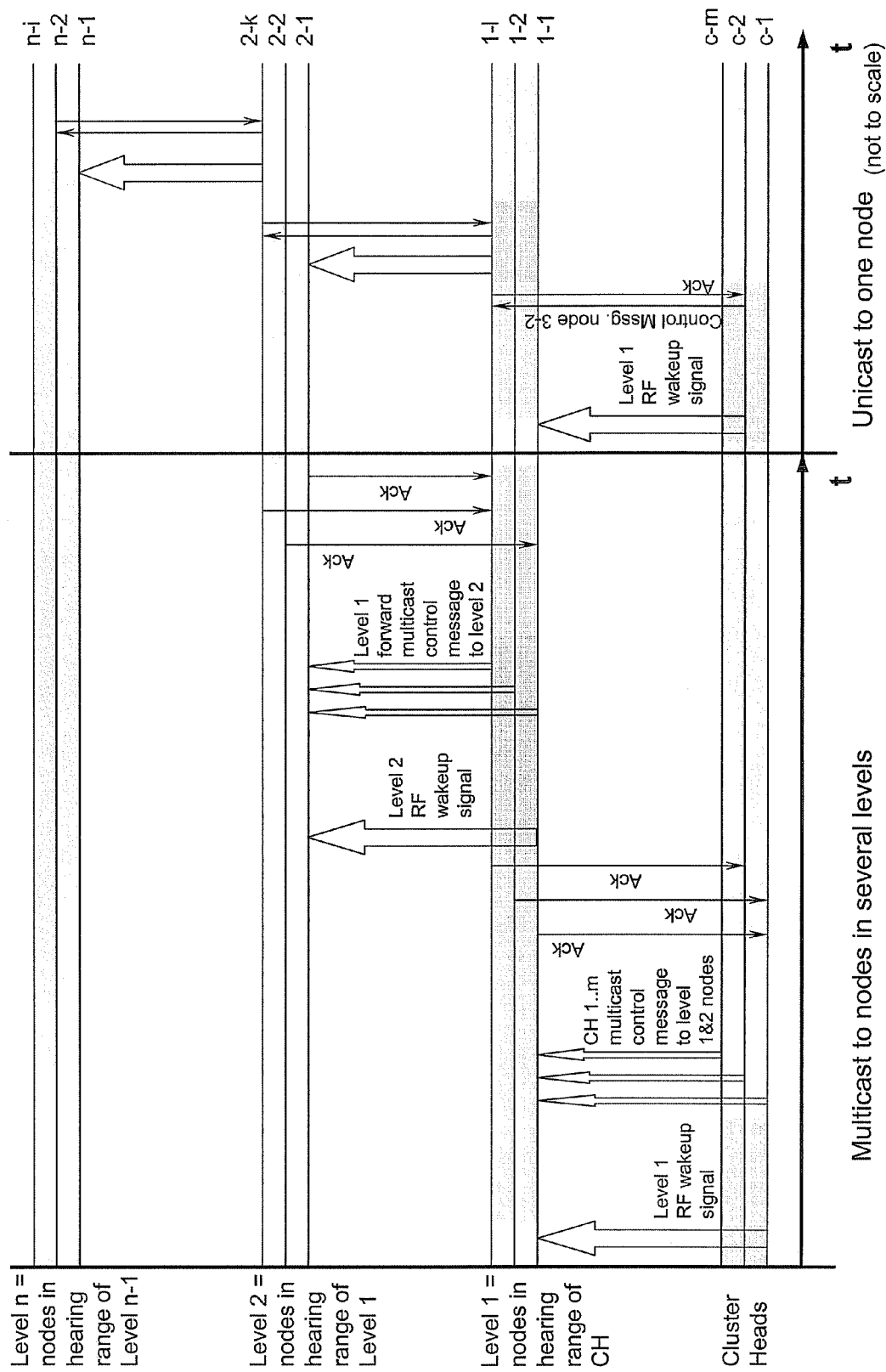
FIG. 5 shows an exemplary message exchange diagram for transmitting high priority control messages.

FIG. 5 shows an exemplary message exchange diagram for transmitting high priority control messages. As in previous figures, the horizontal axis t represents time and the vertical axis of the diagram represents the hierarchical order of network elements. Likewise, the horizontal lines above the time axis t represent specific instances of the network elements, shading surrounding a horizontal line indicates the predominate activity or mode, and arrows represent RF message transmissions. However, unlike previous figures, the time axis t in FIG. 5 represents an overall time slot 5 that includes a multicast transmission segment followed by a unicast transmission segment representing two alternative approaches to transmit the high priority control messages.

In contrast to high priority messages, low priority messages may be used to issue commands from the cluster head to the sensor nodes that do not require immediate attention or reaction, such as, for example, a command to switch links or a command to update calibration factors. Unlike high priority messages, low priority messages require no special packet type. Instead, the message data is appended (i.e. "piggy-backed") onto one or more "supervision acknowledgment packets" to be distributed from node to node during a supervision cycle. A supervision acknowledgement packet with piggy-backed low priority message data may include a target node or target group identifier, a list of forwarding nodes, and a command to be executed at the target nodes.

To ensure a low-latency transfer of information from the sensor nodes to the cluster head, a proper alarm message handling may be performed via, for example, a directed flooding approach or unicast approach. According to an exemplary directed flooding approach, the alarm-generating node may broadcast a wakeup sequence in a RF channel to wake up nodes within the reception range of its broadcast. The broadcast should be sufficiently long so that all nodes have adequate time to receive and process the wakeup sequence. The minimum duration may depend, for example, on the defined period of RF channel monitoring and how precise the nodes are synchronized. Once the wakeup sequence is broadcast, a series of "alarm packets" may then be issued, which may include, for example, the identifier of the source node, its level, an alarm code, and optionally a time stamp. Nodes at levels lower than the source node may forward the alarm packets, preceded by a RF wakeup sequence, to other lower level nodes. If desired, an indirect link-level acknowledgement may be used to truncate the broadcast.

As an alternative to the directed flooding approach, alarm message handling may be performed in a unicast manner based on a separately-defined "alarm topology" or separately-defined "supervision topology". According to an exemplary unicast approach, the alarm-generating node, like in the exemplary directed flooding method, may broadcast a wakeup sequence in a RF channel to wake up nodes within the reception range of its broadcast. As in the exemplary directed flooding approach, the wakeup sequence broadcast should be sufficiently long so that all nodes have adequate time to receive and process the wakeup sequence—the minimum duration depending, for example, on the defined period of RF channel monitoring and how precise the nodes are synchronized. However, unlike the exemplary directed flooded approach, a single "alarm packet" is then unicast to the parent node of the intended target node. The parent node then forwards the message, preceded by the wakeup sequence, to the intended target node. A retransmission of the alarm packet may be attempted until an acknowledgement (either active or passive) is received from the parent. If transmission of the alarm packet is deemed unsuccessful within a predefined time-out period, the alarm message may be resent via a directed flooding approach.

Figure 6:
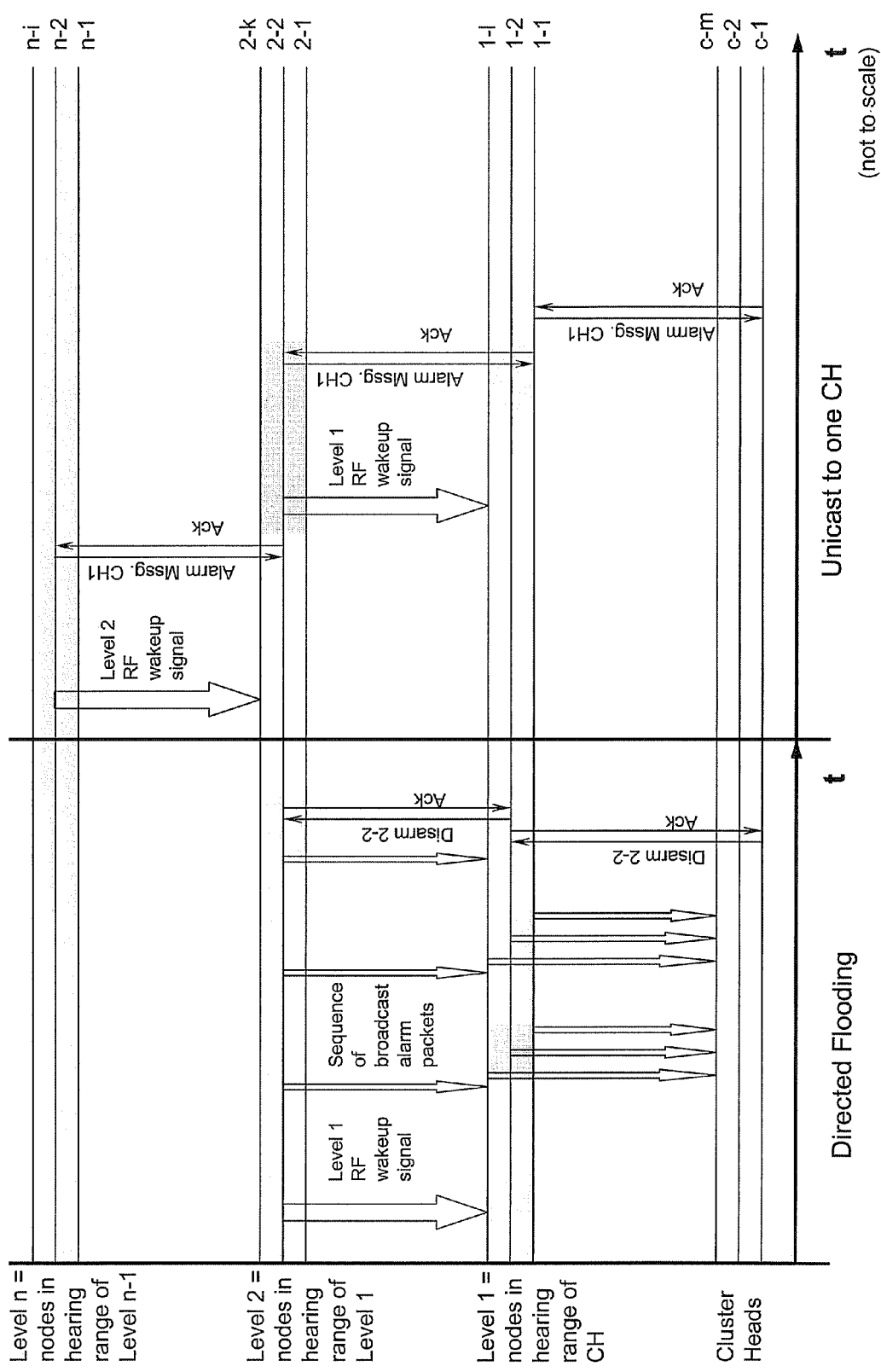
FIG. 6 shows an exemplary message exchange diagram for transmitting alarm messages.

FIG. 6 shows an exemplary message exchange diagram for transmitting alarm messages. As in previous figures, the horizontal axis t represents time and the vertical axis of the diagram represents the hierarchical order of network elements. Likewise, the horizontal lines above the time axis t represent specific instances of the network elements, shading surrounding a horizontal line indicates the predominate activity or mode, and arrows represent RF message transmissions. However, unlike previous figures, the time axis t in FIG. 6 represents an overall time slot 6 that includes a multicast transmission segment followed by a unicast transmission segment representing two alternative approaches to transmit the alarm messages.

To ensure proper functioning of the sensor nodes and to maintain a communication path between them and the cluster heads, supervision may be performed by the exchange of "supervision packets" which may include, for example, status information, appended (i.e., "piggy-backed") low-priority messages, and an optional time stamp. Instead of an explicit forwarding of positive results, however, the nodes may report only inappropriate or potentially dangerous conditions to the cluster heads at regular intervals as defined by, for example, the supervision interval $\tau_S$. During these intervals, the parent-child relationship may be utilized so that every parent may check its children and vice versa. The supervision packets may be actively acknowledged, which, in turn, may include time stamps to update the real-time clocks maintained in every node, as well as optional low-priority control messages. As described earlier, one or more channels may be used for supervision, which are separate, for example, from channels used for alarm or control messaging.

Supervision may be performed according to one or more approaches. For example, supervision may be performed by a level-based time slot approach, a parent-children level-based time slot approach, or a parent-child level-based time slot approach.

According to an exemplary level-based time slot approach, the supervision interval $\tau_S$ may be divided into $n_L$ equal time slots, each commonly used by nodes belonging to a particular level. For a particular time slot, each node belonging to a higher level may unicast a supervision packet to its parent node and await acknowledgement. If no acknowledgement is received, the supervision packet may be retransmitted and if for a predefined number of retransmissions an acknowledgement is still not received, a local reconfiguration may be performed in an attempt to restore connectivity of the particular node by connecting to a "potential" parent node. Optionally, an additional attempt to transmit the supervision packet may be performed in the next supervision cycle prior to attempting a local reconfiguration.

Alternatively, according to an exemplary parent-children level-based time slot approach, the supervision interval $\tau_S$ may be divided into $n_L$ equal time slots and then each time slot may be further divided into slots reserved for a particular parent as well as all of its children. Within a particular slot, each child associated with the slot may unicast a supervision packet to its parent and await acknowledgement. If no acknowledgement is received, the supervision packet may be retransmitted and if for a predefined number of retransmissions an acknowledgement is still not received, a local reconfiguration may be performed in an attempt to restore connectivity of the particular node by connecting to a "potential" parent node. Optionally, an additional attempt to transmit the supervision packet may be performed in the next supervision cycle prior to attempting a local reconfiguration.

Alternatively, according to an exemplary parent-child level-based time slot approach, the supervision interval $\tau_S$ may be divided into $n_L$ equal time slots and then each time slot may be further divided into slots reserved for particular parent-child pairs. Within a particular slot, the according child may unicast a supervision packet to its parent node and awaits acknowledgement. Alternatively, the child node may be polled by its parent and may respond with an acknowledgement. If no acknowledgement is received, the supervision packet may be retransmitted and if for a predefined number of retransmissions an acknowledgement is still not received, a local reconfiguration may be performed in an attempt to restore connectivity to the unacknowledging parent. Optionally, an additional attempt to transmit the supervision packet may be performed in the next supervision cycle prior to attempting a local reconfiguration.

As with each exemplary supervision approach, only nodes involved in a particular time slot may be active, otherwise those nodes not involved remain in the active low power mode.

Figure 7:
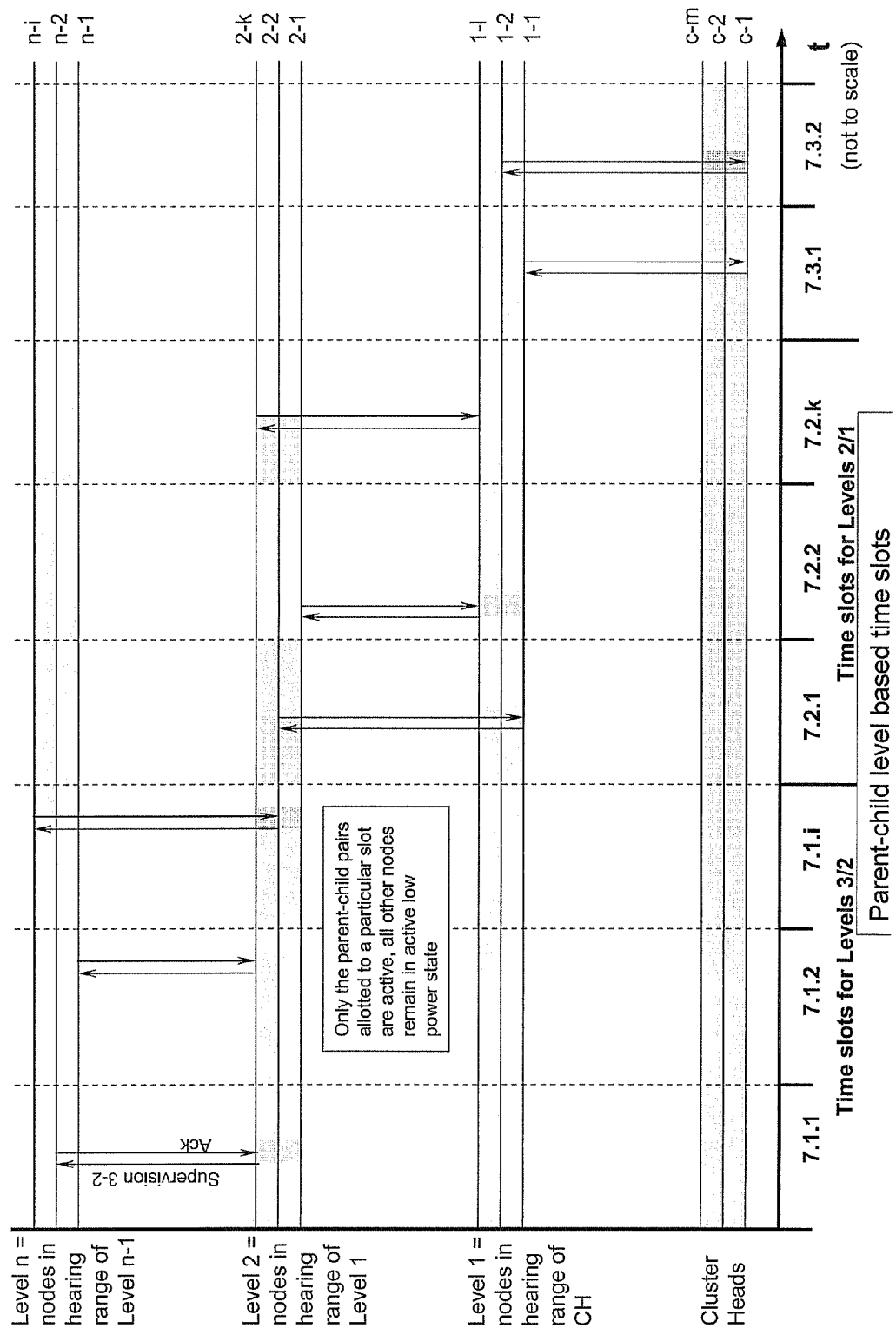
FIG. 7 shows an exemplary message exchange diagram for transmitting supervision messages.

FIG. 7 shows an exemplary message exchange diagram for transmitting supervision messages. As in previous figures, the horizontal axis t represents time and the vertical axis of the diagram represents the hierarchical order of network elements. Likewise, the horizontal lines above the time axis t represent specific instances of the network elements, shading surrounding a horizontal line indicates the predominate activity or mode, and arrows represent RF message transmissions. However, unlike previous figures, the time axis t in FIG. 7 represents an overall time slot 7 that includes segmented time slots representing only the parent-child-level-based approach to transmit the supervision messages.

To remain functional despite a RF-hostile and/or changing environment, the quality of all available links of the network may be monitored (including, for example, links which are currently maintained unassigned) in order to detect, for example, slow and intermediate changes and to allow for reconfiguration/adaptation. Such link quality monitoring may be performed on a regular basis but significantly less frequent, for example, than supervision (e.g., once per day). Similar to the link and discover phase described earlier, each node may broadcast a predefined number of "link assessment packets" preceded by a RF wakeup sequence. The packets may then be received by nodes within a transmission range as defined, for example, within a range of detecting the packets above a predefined threshold of transmission quality.

The link assessment packets may be used, for example, to continuously update the statistics of all available links. Should the quality of a particular link change more than a predefined threshold quantity, nodes may forward the information regarding the changed link status to the cluster heads as data appended (i.e. "piggy-backed") onto supervision packets. Additionally, information regarding energy reserves may also be appended. Alternatively, the information regarding the changed link status may be broadcast as alarm packets.

Link assessment packets may be transmitted, for example, in a channel separate from the channels used to transmit alarm or control packets. The separate channel may be shared in conjunction with supervision.

Link quality monitoring may be scheduled such that each node is assigned a certain number of time slots interspersed with the time slots reserved for supervision. The time slots reserved for link quality monitoring may be assigned so that nodes within "hearing" range do not collide with each other. The scheduling for link quality monitoring may be performed at the cluster heads so that information regarding the reservation of time slots may be distributed to the nodes during establishment of the network topology.

Should a reset of a sensor node occur (such as, for example, a "watchdog timeout" reset or a "brown out" reset), the sensor network may perform a reconfiguration to recover relevant information that may have been stored, for example, in volatile memory and therefore lost during the reset. Such relevant information may include, for example, the system time, the resetting node's parent, its children, and assigned time slots for supervision and/or link quality monitoring.

According to an exemplary reconfiguration method, the sensor nodes may transmit "SOS packets" preceded by a RF wakeup sequence to the neighbors of the resetting node. The SOS packets may include, for example, a node identifier and a packet type. In response to the SOS packets, the receiving nodes which are related to the resetting node (i.e., the parent and/or children) may respond with packets including, for example, their respective node identifiers, time stamp, and time slot for supervision and link quality monitoring. The SOS packets may be retransmitted until the relevant information is received or if a time-out is reached—optionally preceded by several RF wakeup sequences. If a response is not received from the parent within a predefined time-out period, the SOS message may be re-broadcast as an alarm packet so that the relevant reconfiguration information may be received from the cluster head. However, if a response is not received from one or more of the children within the time-out period, the SOS message in not re-broadcast, but rather, it is assumed the non-responding children will attempt to reconfigure via the reset node (i.e., their parent) during the next supervision cycle. Should this second attempt by the children during the next supervision cycle fail to reconfigure the reset node, a second exemplary reconfiguration method may be performed in response to the unsuccessful supervision.

According to the second exemplary reconfiguration method, a child node may attempt to restore connectivity to a parent node that did not respond during supervision. To differentiate whether a node or a link failure has occurred, the cluster head may use information from the sensor nodes regarding the unsuccessful supervision cycle. If using the level-based time slots approach or the parent-children level-based time slots approach for supervision, the "lost" node may attempt to contact its assigned parent or a "potential" parent during its assigned supervision time slot. This process may be repeated for several supervision cycles. Once successfully contacted, the potential parent may send information regarding its "temporary" child to the cluster head as data appended (i.e. "piggy-backed") onto a supervision packet. Should only any potential parents be reached after a predefined number of supervision cycles, the cluster may determine a new parent for the lost node (not necessarily one of the reached potential parents) so that a desired optimum network topology may be maintained. The cluster head may then transmit information regarding the new parent to both the lost node and the new parent. Should neither a potential parent nor the originally assigned parent be reached after the predefined number of supervision cycles, the lost node may broadcast a SOS message as an alarm packet in order to receive the reconfiguration data from the cluster head.

According to a third exemplary reconfiguration method, one or more nodes may perform a reconfiguration at a common predefined time in order to keep the network function without interruption. In particular, the cluster heads may continuously re-compute the optimum network topology based on information regarding, for example, a changed link quality and/or a change in energy reserves at one or more the sensor nodes. If a certain improvement over the current state of the network may be achieved, such as, for example, a decreased load beyond a predefined threshold at a sensor node or a predefined increase in utilization of more reliable links, then information regarding a change in configuration may be sent as low-priority control messages to the affected nodes so that they may adopt the new topology.

According to a fourth exemplary reconfiguration method, the existing network may be extended with the introduction of new nodes, which may be required, for example, to improve the connectivity of the network or to add functionality (e.g., a sensor or actuator) or to reduce the load in specific areas of the network. To achieve the expanded reconfiguration, the unique node identifier and geographical location of the new node may be recorded and installed, along with an exchanged of the network encryption key if applicable. To determine a proper location for the new node with the existing network topology, one or more alternative approaches may be used. The particular alternative approach may depend, for example, whether the new node is to be included solely to add a functionality to the system (e.g., a new door contact in a newly installed door) or whether the new node is required to immediately improve the network connectivity.

In a first exemplary approach to determine the proper location for a new node solely included to add a functionality, the new node, once installed, may broadcast a RF wakeup sequence and then transmit a predefined number of "new node packets". These new node packets may include for example, the node identifier of the new node, its node type, and a packet type identifying the packet as a new node packet. In response, all receiving nodes may build link quality statistics for the new node based on the received new node packets and then, after a predefined period of time, send response packets. These response packets may include, for example, a node identifier of the responding node, its level, a time stamp, and relevant link quality data.

Once the response packets are received, the new node may choose one of the responding nodes to be a temporary parent. This choice may be based, for example, on the received link quality data, which may include, for example, temporary link quality statistics such as a unidirectional link quality, node level of the responding node, and received signal strength. Once a temporary parent is chosen, the new node may forward "registration packets" via this node to the cluster heads. In response, the cluster heads may respond to the new node by sending a "topology establishment packet" that may include, for example, assigned time slots for supervision and link quality monitoring. A more permanent link quality for all links between the new node and its neighbors may be derived after one or more link quality monitoring cycles. Updated link quality data may be sent to a particular cluster head that computes the more permanent topology and then distributed back to the particular involved nodes.

In a second exemplary approach to determine the proper location for a new node required to immediate improve network connectivity, the new node, once installed, may broadcast a RF wakeup sequence and then transmit a predefined number of "new node packets". These new node packets may include for example, the node identifier of the new node, its node type, and a packet type identifying the packet as a new node packet. In response, all receiving nodes may build link quality statistics for the new node based on the received new node packets and then, after a predefined period of time, send response packets. These response packets may include, for example, a node identifier of the responding node, its level, a time stamp, and relevant link quality data. Once received, the new node may acknowledge each responding neighboring node with a packet that may specify, for example, a sequence number for determining when to start sending a sequence of packets. In response, the neighboring nodes may each, in turn, transmit a series of "link assessment packets" according their assigned sequence number. As such, the new node may immediately derive bi-directional link quality statistics. Subsequently, the new node may choose one of the responding nodes to be its temporary parent and then forwards a "registration packet" including the derived bi-directional data for all its neighbors to the cluster heads via the chosen temporary parent. In response, the cluster heads may send a "topology establishment packet" to the new node, which may include, for example, a node identifier of a newly assigned permanent parent for the new node, its assigned children, and time slots for supervision and link quality monitoring. As such, the newly assigned parent may deduce from the forwarded packet its new role as parent. The new node may then notify its assigned children of regarding the change parental change of the new node as their new parent, as well as new supervision time slots for the children. In turn during the next supervision cycle, the children may notify their "old" parents of the relationship change and begin supervision with new parent only.

Should a cluster head fail, the sensor network may perform a reconfiguration to form a new topology without the failed cluster head. According to a fifth exemplary reconfiguration method, a new topology and new time slots may be re-computed for those nodes affected by the failing cluster head. However, since the cluster head network may have its own separate supervision and reconfiguration scheme, the sensor node network may wait until the cluster head network itself has properly reconfigured before re-computing new topology data and time slots for any affected nodes. Thus, once the cluster head network has re-computed a new topology for the remaining cluster heads, a new topology and new time slots may be re-computed for the affected sensor nodes and communicated to them via, for example, high priority control messages.

What is claimed is:

1. A method for initializing a sensor node network arranged in a hierarchical manner with a plurality of node levels and a cluster head network, comprising:
   establishing a temporary topology and synchronizing the sensor node network;
   discovering and assessing at least one link of the sensor node network; and
   registering a sensor node of the sensor node network with a cluster head of the cluster head network,
   wherein the step of establishing the temporary topology and synchronizing further includes:
      broadcasting a wakeup signal from a lower level node to a higher level node;
      transmitting an initialization packet from the lower level node to the higher level node;
      synchronizing the higher level node;
      transmitting a temporary registration packet from the higher level node to the lower level node; and
      repeating the steps of broadcasting the wakeup signal, transmitting the initialization packet; synchronizing, and transmitting the temporary registration packet until one of all nodes have been reached and all nodes up to a predefined level have been reached.

2. The method of claim 1, wherein the lower level node is the cluster head and the high level node is a first level sensor node.

3. The method of claim 1, wherein the lower level node is a first level node and the higher level node is a second level node.

4. The method of claim 1, wherein the higher level node is an upper limit level node.

5. The method of claim 1, wherein the step of discovering and assessing further includes:
   broadcasting a plurality of link assessment packets.

6. The method of claim 5, wherein the link assessment packets are broadcast in a fully randomized manner.

7. The method of claim 5, wherein the link assessment packets are broadcast by different nodes of the network in different defined time-slots.

8. The method of claim 1, wherein the step of registration further includes:
   forwarding a plurality of registration packets.

9. The method of claim 8, wherein the registration packets are forwarded in randomized individual node approach.

10. The method of claim 8, wherein the registration packets are forwarded in a time-slotted manner, by which each of a plurality of time slots is assigned to a single respective one of the plurality of node levels.

11. The method of claim 8, wherein registration data from higher level nodes is piggy-backed to registration packets transmitted by lower level nodes.

12. The method according to claim 1, further comprising:
   computing a network topology.

13. The method of claim 12, wherein the network topology is computed to reduce power consumption.

14. The method of claim 12, wherein the network topology is computed so that an expected battery life of all nodes is essentially equalized.

15. The method of claim 1, further comprising:
   distributing a network topology.

16. The method of claim 15, wherein the step of distributing the network topology further includes:
   transmitting a plurality of topology establishment packets.

17. The method of claim 16, wherein the topology establishment packets are transmitted in a random manner.

18. The method of claim 16, wherein the topology establishment packets are transmitted in a time-slotted manner, by which each of a plurality of time slots is assigned to a single respective one of the plurality of node levels.

19. The method of claim 18, wherein a transmission period is divided into a time slot for each level of the sensor node network.

20. The method of claim 1, wherein the at least one link of the sensor node network is assessed to update at least one statistic of the at least one link.

21. The method of claim 1, wherein the at least one link of the sensor node network is assessed based on at least one of a power level and a packet success rate to reachable network elements.

22. The method of claim 1, further comprising:
installing the sensor node in the sensor node network;
assigning a unique identifier to the sensor node;
waking-up the sensor node to perform a task; and
in response to completing the task, setting the woken sensor node to an active low power mode prior to a propagation of messaging to all node levels in the sensor node network.

23. The method of claim 22, further comprising:
distributing an encryption key to the sensor node.

24. The method of claim 22, further comprising:
supervising the sensor node network with acknowledged supervision packets to update a clock of the sensor node.

25. The method of claim 24, wherein the supervision packets are sent in a periodic manner.

26. The method of claim 22, wherein a clock of the sensor node is synchronized with respect to its node level.

27. The method of claim 22, further comprising:
assigning the sensor node to a single one of the plurality of node levels, wherein each of the nodes of the sensor node network is assigned to a single respective one of the plurality of node levels.

28. The method of claim 27, wherein the assignment of the nodes to the respective node levels is in accordance with respective power constraints of the nodes.

29. The method of claim 22, wherein each of the nodes of the sensor node network is assigned to a respective one of the plurality of node levels and each of the plurality of node levels is assigned a respective one of a plurality of communication time slots.

30. A method for initializing a sensor node network arranged in a hierarchical manner with a plurality of node levels and a cluster head network, comprising:
establishing a temporary topology and synchronizing the sensor node network;
discovering and assessing at least one link of the sensor node network; and
registering a sensor node of the sensor node network with a cluster head of the cluster head network,
wherein the step of discovering and assessing further includes broadcasting a plurality of link assessment packets in a time-slotted manner, by which a broadcast period is divided into a respective time slot for each level of the sensor node network.

31. The method of claim 30, wherein the broadcast occurs only within a small fraction of the time slot.

32. The method of claim 30, wherein the broadcast occurs randomly with the time slot.

33. The method of claim 30, wherein the broadcast occurs based on a unique identifier associated with the sensor node.

34. The method of claim 30, wherein the broadcast occurs based on a code to ensure that any two node interfere at most in only one time slot.

35. A method for initializing a sensor node network arranged in a hierarchical manner with a plurality of node levels and a cluster head network, comprising:
establishing a temporary topology and synchronizing the sensor node network;
discovering and assessing at least one link of the sensor node network; and
registering a sensor node of the sensor node network with a cluster head of the cluster head network,
wherein:
the step of registration further includes forwarding a plurality of registration packets; and
the registration packets are forwarded in a time-slotted manner, by which a broadcast period is divided into a respective time slot for each level of the sensor node network.

36. The method of claim 35, wherein a broadcast order for the each level includes a higher to lower order.

37. A method to wirelessly network a sensor node, comprising:
installing the sensor node in a sensor node network arranged in a hierarchical manner with a plurality of node levels and a cluster head network;
assigning a unique identifier to the sensor node;
initializing the sensor node network, wherein the initializing includes:
establishing a temporary topology and synchronizing the sensor node network;
discovering and assessing at least one link of the sensor node network; and
registering a sensor node of the sensor node network with a cluster head of the cluster head network; and
the sensor node:
periodically entering an awake state;
activating a receiver component, the receiver component performing a receiver-signal strength measurement in a reserved channel;
determining if the strength measurement is greater than a threshold;
responsive to the determination of the strength measurement:
when the strength measurement is not greater than the threshold, entering an active low power mode; and
when the strength measurement is greater than the threshold, determining whether a wakeup sequence is included at a start of a message that has been received; and
responsive to the determination of the wakeup sequence:
when the wakeup sequence is included, maintaining the awake state to perform a task for performance of which the wakeup sequence was transmitted, the task including determining intended recipients of the message, and subsequently entering the active low power mode, prior to a propagation of the message to all node levels in the sensor node network, once the task is complete; and
when the wakeup sequence is not included, entering the active low power mode.

* * * * *